(12) United States Patent
Herr et al.

(10) Patent No.: US 6,425,718 B1
(45) Date of Patent: Jul. 30, 2002

(54) DIRECT MULTI-TENSION INDICATING WASHER HAVING BUMPS OF A FIRST AND SECOND HEIGHT

(75) Inventors: John A. Herr, West Chesterfield, NH (US); Ivan Wayne Wallace, Ludlow, VT (US)

(73) Assignee: Applied Bolting Technology Products Inc., Ludlow, VT (US)

(*) Notice: Subject to any disclaimer, the term of this patent is extended or adjusted under 35 U.S.C. 154(b) by 0 days.

(21) Appl. No.: 09/613,993

(22) Filed: Jul. 11, 2000

(51) Int. Cl.$^7$ ................................................ F16B 31/02
(52) U.S. Cl. ............................. 411/10; 411/13; 411/14
(58) Field of Search .......................... 411/1–14; 116/212

(56) References Cited

U.S. PATENT DOCUMENTS

| | | |
|---|---|---|
| 2,191,101 A | 2/1940 | Stellin |
| 2,274,010 A | 2/1942 | Stellin |
| 2,476,561 A | 7/1949 | Pederson |
| 2,781,687 A | 2/1957 | Knocke |
| 2,850,937 A | 9/1958 | Ralston |
| 2,943,528 A | 7/1960 | Curry |
| 3,187,621 A | 6/1965 | Turner |
| 3,304,827 A | 2/1967 | Bush |
| 3,383,974 A * | 5/1968 | Dahl |
| 3,476,009 A | 11/1969 | Markey |
| 3,788,186 A * | 1/1974 | Crites |
| 3,948,141 A | 4/1976 | Shinjo |
| 4,020,734 A | 5/1977 | Bell |
| 4,072,081 A | 2/1978 | Curtis et al. |
| 4,149,446 A | 4/1979 | Spengler et al. |
| 4,322,193 A | 3/1982 | Stahl |
| 4,347,024 A | 8/1982 | Coldren |
| 4,498,825 A | 2/1985 | Pamer et al. |
| 4,703,711 A * | 11/1987 | Haynes |
| 4,793,757 A | 12/1988 | Petersen |
| 5,015,132 A | 5/1991 | Turner et al. |
| 5,056,975 A | 10/1991 | Ando |
| 5,088,866 A * | 2/1992 | Ischebeck |
| 5,370,483 A | 12/1994 | Hood et al. |
| 5,667,346 A | 9/1997 | Sharp |
| 5,769,581 A | 6/1998 | Wallace et al. |
| 5,931,618 A | 8/1999 | Wallace et al. |

FOREIGN PATENT DOCUMENTS

| | | |
|---|---|---|
| GB | 1184033 | 3/1970 |
| JP | 52-9757 | 1/1977 |

* cited by examiner

Primary Examiner—Flemming Saether
(74) Attorney, Agent, or Firm—Cantor Colburn LLP

(57) ABSTRACT

A washer extrudes indicating material of varying colors depending on the compression force applied to it by providing a first and second surface having respective bumps and indentations. The compression force on the washer is equal to the tension of a bolt passing through the washer. The indentations in the second surface are filled with a solid extrudable colored material. By making at least a first bump taller than at least a second bump, the first bump will compress before the second bump, causing it to extrude the color material in its corresponding indentation before the second bump does the same as the tension in the bolt is increased. By making the material under the first bump a different color than the material under the second bump, an operator can determine which of two desired tensions the bolt has reached. In use, an operator merely tightens the bolt passing through the washer or a nut threaded to the bolt until the bolt reaches a first desired tension as indicated by the extruded material of the first color, such as green. An intervening step is performed at the first bolt tension, if required. Then, the operator continues to tighten the bolt or nut until the bolt reaches a second desired tension as indicated by the extruded material of the second color, such as red.

11 Claims, 3 Drawing Sheets

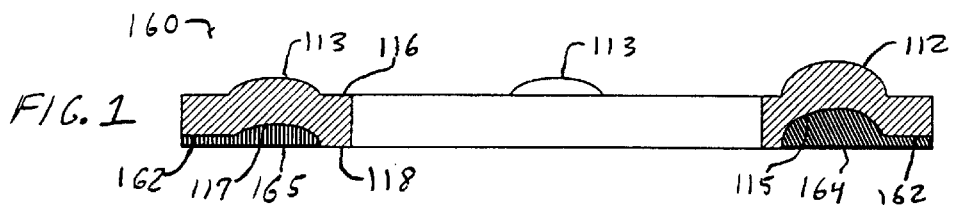
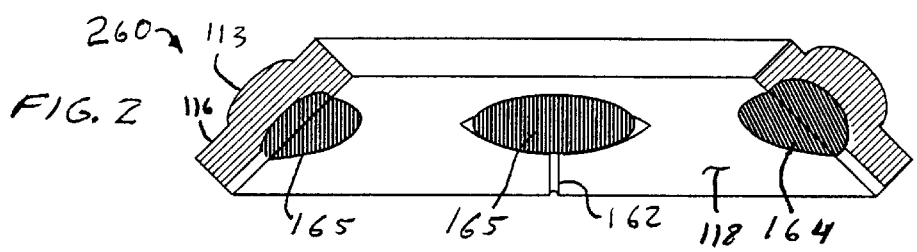
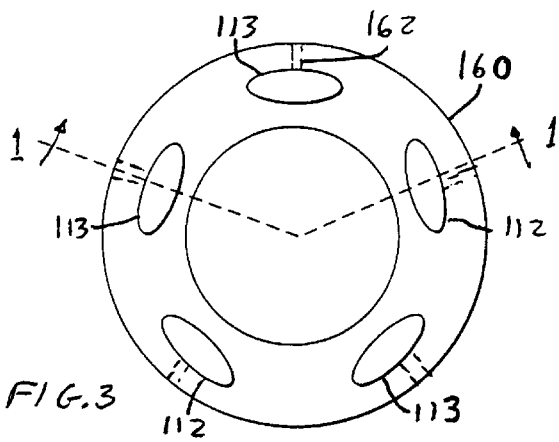
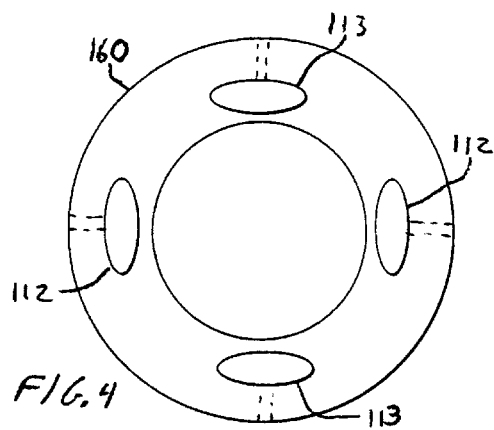
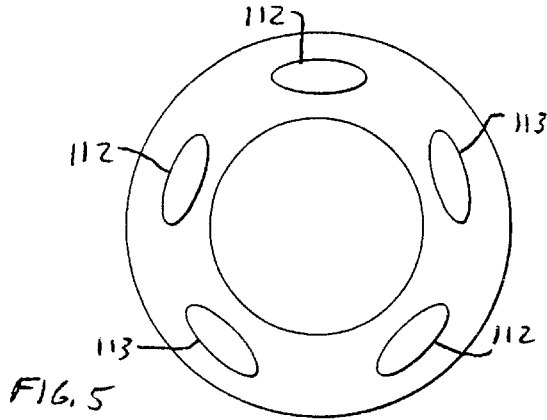
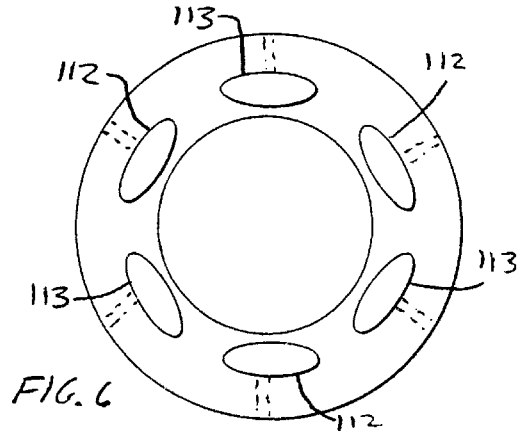

DIRECT MULTI-TENSION INDICATING WASHER HAVING BUMPS OF A FIRST AND SECOND HEIGHT

FIELD OF THE INVENTION

This invention relates in general to direct tension indicating and maintaining washers and in particular to direct tension indicating and maintaining washers that maintain bolt tension and/or indicate when the proper bolt tension has been achieved.

DISCUSSION OF THE PRIOR ART

The present invention is an improvement to commonly-assigned U.S. Pat. No. 5,931,618 issued Aug. 3, 1999 to Wallace et al. hereby incorporated by reference herein. Referring to FIGS. 10–13, the prior art device comprises a direct tension indicating washer 60 having bumps 12. As bolt 50 is tightened, the head of bolt 50 squeezes bumps 12 flat against surface 10. An indicating material 64, such as colored silicone compound, is deposited in indentations beneath bumps 12 (see FIG. 11). Thus, as bumps 12 become flattened, so do the indentations, causing the indicating material to squeeze out through channels 62 from beneath direct tension indicating washer 60 and the bolt head as shown in FIG. 13, providing an immediately visible indication that a desired bolt minimum tension has been reached.

There are, however, applications which a single known bolt tension is insufficient. For example, sometimes it is desirable to know that a bolt has be tensioned to within a specified range. In this circumstance, it would be desirable to know not just that a bolt has been tensioned beyond a specific minimum, but that it has not been tensioned too far, i.e., beyond a maximum allowable tension.

Additionally, there are some bolting applications where the bolt must be tightened to two specific tensions. For example, a lower tension may be needed for pre-assembly conditions and "running in" of the machine or equipment, and then a higher tension for service life.

SUMMARY

The limitations of the prior art noted above are overcome by providing a direct multi-tension indicating washer that extrudes indicating material of varying colors depending on the compression force applied to it. The direct multi-tension indicating washer has a first and second surface having respective bumps and indentations. The compression force on the washer is equal to the tension in the bolt which has been inserted through the washer. The indentations in the second surface are filled with a solid extrudable colored material. By making at least a first bump taller than at least a second bump, the first bump will compress before the second bump, causing it to extrude the color material in its corresponding indentation before the second bump does the same as the tension in the bolt is increased. By making the material under the first bump a different color than the material under the second bump, an operator can determine which of two desired tensions the bolt has reached.

In use, an operator merely tightens the bolt passing through the washer or a nut threaded onto the bolt until the bolt reaches a first desired tension as indicated by the extruded material of the first color, such as green. An intervening step is performed at the first bolt tension, if required. Then, the operator continues to tighten the bolt or nut until the bolt reaches a second desired tension as indicated by the extruded material of the second color, such as red.

BRIEF DESCRIPTION OF THE DRAWINGS

FIG. 1 shows a cross section of the invention according to a preferred embodiment;

FIG. 2 shows a cross section of the invention according to another preferred embodiment;

FIGS. 3, 4, 5, and 6 show a plan view of the invention according to various embodiments thereof;

DETAILED DESCRIPTION OF THE INVENTION

Figure 7:
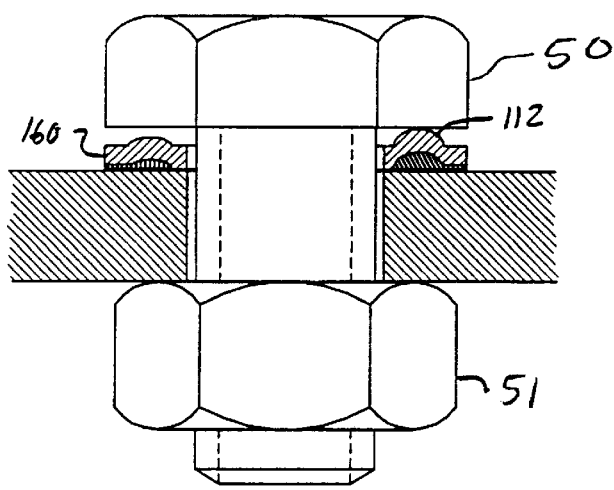
FIGS. 7, 8, and 9 depict an exemplary use of the invention according to a preferred embodiment thereof.

FIG. 3 shows a plan view of a direct multi-tension indicating washer according to a first embodiment of the invention. FIG. 1 is a cross section view of the washer shown in FIG. 3, taken along line 1—1. FIG. 2 shows an alternate embodiment of the invention in cross-section view, i.e., a direct multi-tension indicating and maintaining washer 260. This washer is formed in a conical shape but has all the properties of the direct multi-tension indicating washer and additionally has the benefit of the conical shape, which helps to maintain the tension on the bolt. The direct multi-tension indicating washer 160 and the direct multi-tension indicating and maintaining washer 260 are similar to the direct tension indicating washer and direct tension indicating and maintaining washer of the prior art shown in FIGS. 10–13, and/or in U.S. Pat. No. 5,931,618 issued Aug. 3, 1999 to Wallace et al. which is hereby incorporated herein by reference. Unlike the direct tension indicating and direct tension indicating and maintaining washer of the prior art, the direct multi-tension indicating washer 160 has bumps 112 of a first height on first side 116 with a first color indicating material 164 in corresponding indentation on a second side 118 of washer 160 and bumps 113 of a second height the first side 116 with a second color indicating material 165 in a corresponding indentation on second side 118 of washer 160. In contrast, the prior art direct tension indicating washer 60 (shown in FIGS. 10–13) and direct tension indicating and maintaining washer 70 (shown in U.S. Pat. No 5,931,618 referenced above) all the bumps (12) are substantially the same height.

It is contemplated that the first color indicating material 164 may be green while the second color indicating material 165 may be red, but the invention includes the use of any combination of colors under the bumps 112 and 113. Furthermore, in specialized applications requiring more than two bolt tensions, bumps of three or more different sizes may be provided to indicate any number of tensions that are required.

The direct multi-tension indicating washer 160 is manufactured in a process similar to the direct tension indicating washer 60 or direct tension indicating and maintaining washer of the prior art. A tool and die are used to stamp the bumps 112, 113, corresponding indentations 115, 117, and channels 162 into a blank washer. Other processes, such as metal machining or metal casting may be used to manufacture the direct multi-tension indicating washer 160. In all cases, the metal product may be heat treated by quenching and tempering after forming to produce the required strength and elasticity. In an exemplary embodiment, the direct multi-tension indicating washer 160 is made from carbon steel, but stainless steel, nonferrous metals, and other alloy products may also be used. The indicating material 164 and 165 is an extrudable, elastomeric material such as a colored silicone.

FIGS. 3, 4, 5 and 6 show various configurations of a direct multi-tension indicating washer according to the invention. FIGS. 3 and 5 show a direct multi-tension indicating washer having five bumps. In FIG. 3, there are two high bumps 112 and three low bumps 113 while in FIG. 5, there are three high bumps and two low bumps. FIG. 4 shows an embodiment having four bumps including two high bumps 112 and two low bumps 113 and FIG. 6 shows an embodiment having three high bumps 112 and three low bumps 113. While these embodiments show the high and low bumps distributed generally evenly around the circumference of the washer, this is not a requirement for the operation of the washers. The high bumps and low may be distributed in any way, for example the high bumps 112 may be on one side of the washer while the low bumps 113 are on the other side.

Figure 8:
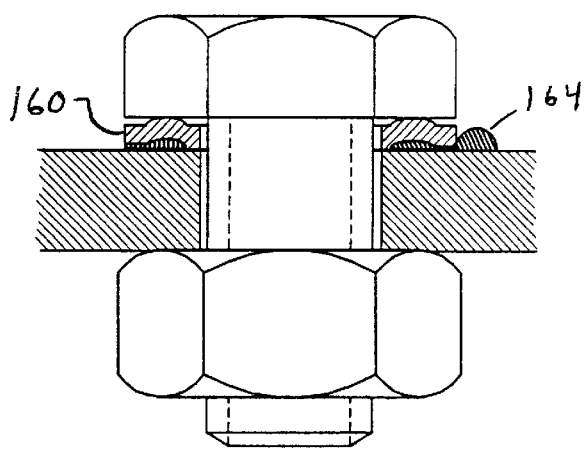
Figure 9:
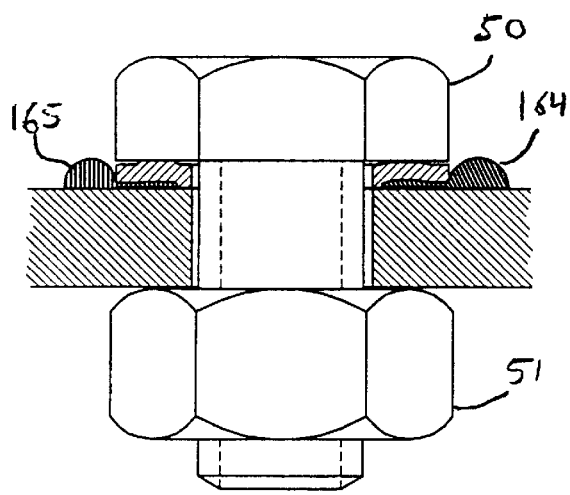
Figure 10:
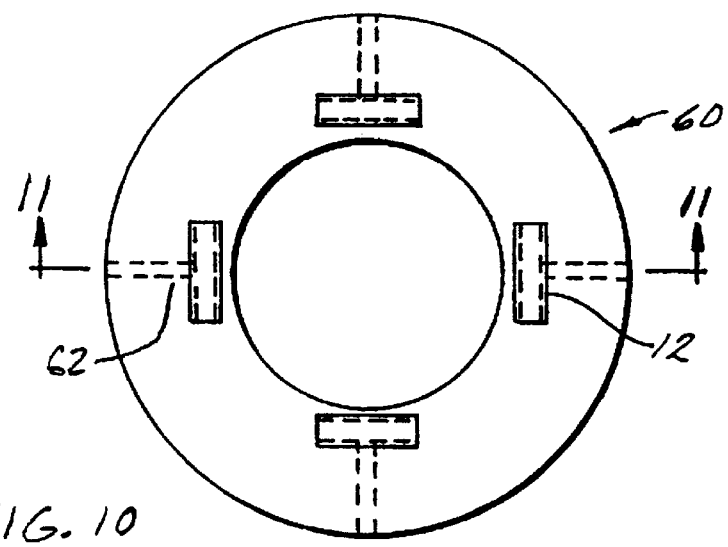
FIGS. 10 and 11 show a washer according to the prior art in plan and cross-section views.
Figure 11:
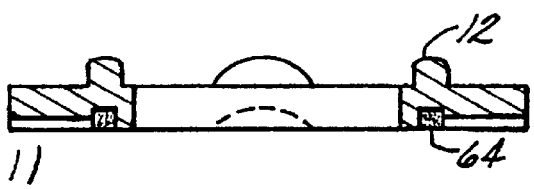
Figure 12:
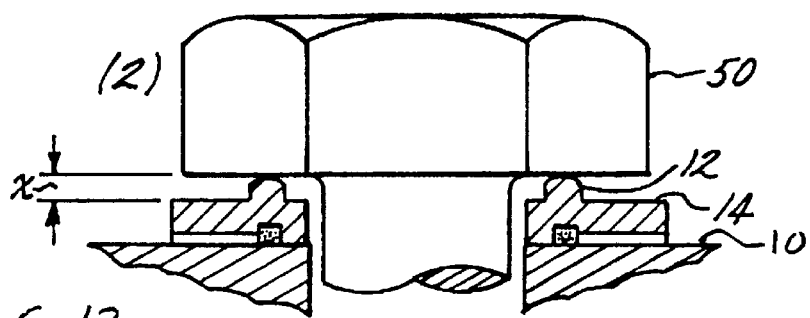
FIGS. 12 and 13 depict the use of a washer according to the prior art.
Figure 13:
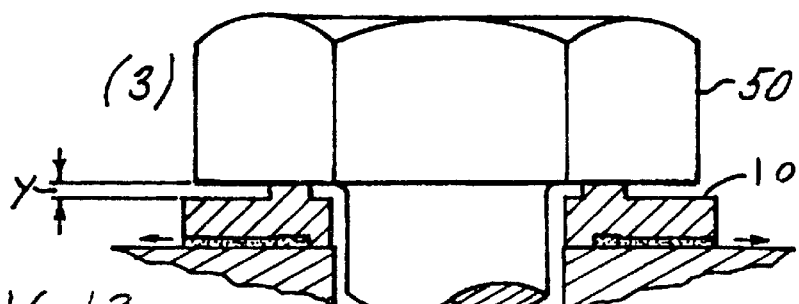

FIGS. 7–9 illustrate the state of the direct multi-tension indicating washer 160 as a bolt 50 is tightened on it. As shown in FIG. 7, the bolt 50 is placed through an opening in the center of the direct multi-tension indicating washer 160 and tightened onto nut 51 until the bottom of the bolt head contacts the bumps 112. At this point, bumps 112 and 113 have not deformed and so indicating material 164 and 165 remain in the depressions 115 and 117 beneath bumps 112 and 113. In FIG. 8 we see that the high bumps 112 have been partially compressed, squeezing indicating material 164 of a first color, such as green, out from beneath washer 160, thus indicating that the bolt tension has reached a first predetermined tension.

In FIG. 9, bolt 50 has been further tightened so that both high bumps 112 and low bumps 113 have been deformed and in addition to the squeezing indicating material 164 of a first color, material 165 of a second color, such as red is now exposed, thus indicating that the bolt tension has reached a second predetermined tension.

In use, high bumps 112 are configured to squirt early, and by their green color, telling the operator to keep tightening. As the tightening progresses, the low bumps 113 will squirt later, telling the operator to stop by the red color. Furthermore in actual operation, the extruded indicating material 164 and 165 shown in FIGS. 8 and 9 will not necessarily be the idealized round balls of material shown. Instead, the indicating material splatter, distributing the indicating material a greater distance from the direct multi-tension indicating washer, thereby making it more visible. The form that the extruded indicating material takes depends on the composition of the material, the shape and configuration of the bump and channel, and possibly even the speed of the tightening process. By using bumps designed to suddenly collapse when under a certain pressure, such as a bi-stable configuration, and shaping channel 162 into a nozzle, a splattering effect can be achieved.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A direct multi-tension indicating washer comprising:
    a first surface having at least one discrete bump of a first height formed thereon and at least one discrete bump of a second height formed thereon, the first height being different than the second height;
    a second surface having a discrete indentation formed opposite each of said bumps;
    an indicating material of a first color positioned in each of said discrete indentations opposite said at least one discrete bump of a first height; and
    an indicating material of a second color positioned in each of said discrete indentations opposite said at least one discrete bump of a second height.

2. The direct multi-tension indicating washer set forth in claim 1 further comprising:
    a plurality of channels formed in said second surface, each channel leading from a corresponding one of said indentations to an outer circumference of said direct multi-tension indicating washer.

3. The direct multi-tension indicating washer set forth in claim 1 wherein as pressure is increased on said first and second surfaces of said washer, said bumps compress, forcing the indicating material out from underneath the bumps.

4. The direct multi-tension indicating washer set forth in claim 3 wherein said pressure is caused by and is proportional to a tension in a bolt passing through said washer.

5. The direct multi-tension indicating washer set forth in claim 1 wherein
    said at least one discrete bump of a first height comprises at least one taller bump and said at least one bump of a second height comprise at least one shorter bump,
    said at least one taller bump being relatively taller than said shorter bump, wherein
        as increased pressure is exerted on the first and second surfaces of the washer, the at least one taller bump becomes compressed at a first lower pressure thus causing said indicating material of a first color to be forced out from beneath said at least one taller bump at said first lower pressure thereby indicating a first tension in a bolt passing through said washer, then as pressure is increased to a second higher pressure, said at least one shorter bump becomes compressed causing said indicating material of a second color to be forced out from beneath said at least one shorter bump at said second higher pressure, said indicating material of a second color thereby indicating a second tension in the bolt passing through said washer.

6. The direct multi-tension indicating washer set forth in claim 1 wherein said indicating material of a first color is forced out from beneath said washer when said washer experiences a first pressure thereby providing an indication to an operator that a bolt passing through the washer has reached a first tension, and said indicating material of a second color is forced out from beneath said washer when said washer experiences a second pressure, which is greater than said first pressure, thereby providing an indication to said operator that the bolt passing through the washer has reached a second tension which is greater than said first tension.

7. The direct multi-tension indicating washer set forth in claim 1 wherein said washer is conical for operating as a tension maintaining washer.

8. The direct multi-tension indicating washer set forth in claim 1 wherein the first color is different than the second color.

9. A method of tensioning a bolt, comprising:
    passing said bolt through a direct multi-tension indicating washer having
        a first surface having at least one discrete bump of a first height formed thereon and at least one discrete bump of a second height formed thereon, the first height being different than th second height;

a second surface having a discrete indentation formed opposite each of said bumps;

an indicating material of a first color positioned in each of said discrete indentations opposite said at least one discrete bump of a first height; aid an indicating material of a second color positioned in each of said discrete indentations opposite said at least one discrete bump of a second height;

tightening said bolt or a nut threaded to said bolt until said indicating material of a first color is forced out forced beneath said direct multi-tension indicating washer thus indicating that said bolt has leached a first desired tension.

10. The method set forth in claim 9 Further comprising:

further tightening said bolt or the nut threaded to said bolt until said indicating material of a second color is forced out from beneath said direct multi-tension indicating washer thus indicating that said bolt has reached a second desired tension.

11. The method set forth in claim 9 wherein the first color is different than the second color.

* * * * *

UNITED STATES PATENT AND TRADEMARK OFFICE
CERTIFICATE OF CORRECTION

PATENT NO. : 6,425,718 B1
DATED : July 30, 2002
INVENTOR(S) : John A. Herr et al.

It is certified that error appears in the above-identified patent and that said Letters Patent is hereby corrected as shown below:

Column 1,
Line 29, after "has" delete "be" and insert -- been --.

Column 3,
Line 45, after "material" delete "splatter" and insert -- splatters --.

Column 4,
Line 66, after "having" insert -- a --.

Column 5,
Line 2, after "than" delete "th" and insert -- the --;
Line 7, after "height;" delete "aid" and insert -- and --;
Line 12, after "out" delete "forced" and insert -- from --.

Column 6,
Line 2, after "bolt has" delete "leached" and insert -- reached --.

Signed and Sealed this

Seventh Day of February, 2006

JON W. DUDAS
*Director of the United States Patent and Trademark Office*